United States Patent [19]

Takagaki et al.

[11] Patent Number: 4,554,227

[45] Date of Patent: Nov. 19, 1985

[54] ALKALINE BATTERY

[75] Inventors: Tokujiro Takagaki; Tetsuo Sasaki; Haruo Seike, all of Kyoto, Japan

[73] Assignee: Japan Storage Battery Company Limited, Japan

[21] Appl. No.: 583,479

[22] Filed: Feb. 24, 1984

[30] Foreign Application Priority Data

Jul. 18, 1983 [JP] Japan ............................. 58-131739
Jul. 25, 1983 [JP] Japan ............................. 58-136345

[51] Int. Cl.⁴ ............................................. H01M 2/02
[52] U.S. Cl. .................................... 429/178; 429/94; 429/122; 429/211
[58] Field of Search ................ 429/121, 122, 178, 94, 429/161, 211

[56] References Cited

U.S. PATENT DOCUMENTS

| | | | |
|---|---|---|---|
| 3,245,837 | 4/1966 | Ikeda et al. | 429/94 X |
| 3,393,095 | 7/1968 | Philipp | 429/94 |
| 3,732,124 | 5/1973 | Cailley | 429/211 X |
| 3,846,175 | 11/1974 | Desai | 429/161 X |
| 3,960,603 | 6/1976 | Morioka et al. | 429/211 X |
| 4,332,867 | 6/1982 | Tsuda et al. | 429/94 |
| 4,452,869 | 6/1984 | DeMoully et al. | 429/211 X |

Primary Examiner—Charles F. LeFevour
Attorney, Agent, or Firm—Sughrue, Mion, Zinn, Macpeak and Seas

[57] ABSTRACT

A connecting piece structure for connecting the plates of an alkaline battery to the battery terminals and a method of welding the connecting piece structure to the plates. The connecting piece is designed to have two slanting surfaces which intersect along a ridge line, the connecting piece having a V-shaped configuration in cross section. The method uses welding electrodes, having bottoms with recessed surfaces which conform to the connecting piece configuration, to weld the connecting piece to the plates.

9 Claims, 13 Drawing Figures

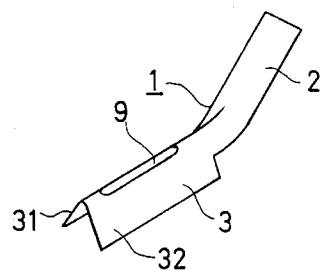
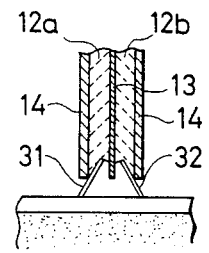
FIG. 6
FIG. 7
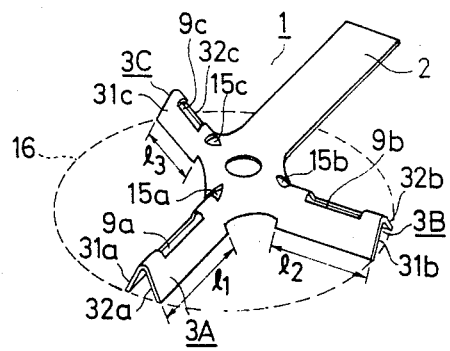
FIG. 8
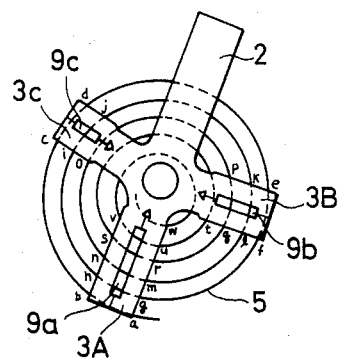
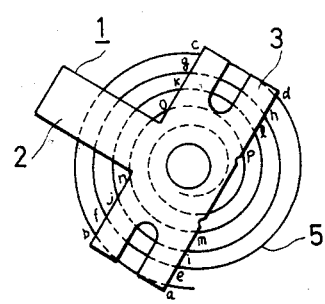
FIG. 9
FIG. 10

ALKALINE BATTERY

BACKGROUND OF THE INVENTION

This invention relates to a structure for connecting the plates of an alkaline battery, such as a nickel-cadmium or nickel-zinc battery, to battery terminals, and to a method of connecting the plates to the terminals. The invention provides alkaline batteries which have uniform characteristics, which are stable in performance, which are high in reliability and which have excellent high-rate charge and discharge characteristics.

In general, in an alkaline battery, a plate assembly is formed by winding or laminating positive and negative plates with a separator interposed therebetween. The plates are wound in such a manner that the cores of the plates are partially protruded from the end faces of the plate assembly, and the exposed (mass-free) parts of the plate are welded to connecting pieces which are connected to the terminals (or to the container and the cover of the battery which are the negative terminal and the positive terminal).

There have been proposed a variety of methods of connecting the plates and terminals of an alkaline battery of this type. However, none of them provide alkaline batteries which exhibit optimum characteristics.

For instance, U.S. Pat. No. 3,732,124 has disclosed a connecting piece having a current collector which is made up of a flat portion and edge portions which are extended downwardly and vertically from the flat portion. The edge portions are mounted on the exposed (mass-free) part of the plate so that the edge portions vertically cross the exposed part of the plate, which theoretically allows the edge portions to be positively welded to the exposed part of the plate. However, in practice, since the edge portions are partially deformed or inclined by the pressure which is applied during the welding operation, the edge portions do not vertically cross the exposed part of the plate at all of the contact points, and accordingly the connecting piece cannot be uniformly and firmly welded to the exposed parts of the plate core. Attempts have been made to increase the strength of such welds by changing the welding conditions in various ways, however, often the current collector changes dark violet and sometimes the material becomes brittle or the current collector becomes molten.

U.S. Pat. No. 3,960,603 has disclosed a method in which a number of samll holes are cut in the current collector of a connecting piece and edges or protrusions are formed around the small holes, so that the edges or protrusions are welded to the exposed (mass-free) part of the plate. However, this method is still disadvantageous for several reasons. In practice, the welding points are not steady. As a number of edges or protrusions are employed for welding, the strength of the welds is low as a whole, and it is difficult to provide a predetermined welding strength. Accordingly, sometimes the plate assembly can be readily removed from the connecting pieces, with the result that the batteries are non-uniform in performance.

FIG. 1 shows a typical conventional connecting piece which has been disclosed by the aforementioned U.S. Pat. No. 3,732,124. FIG. 2 shows the connecting piece in FIG. 1 welded to a plate assembly. The connecting piece 1 is made of a thin nickel-plated steel plate, for example, and comprises a lead 2 connected to a terminal of the battery, and a current collector 3 which is welded to the exposed (mass-free) part of a plate. The current collector 3 includes a flat portion 7b and edges 7a extended vertically from the flat portion 7b. The edges 7a of the current collector are mounted on the exposed (mass-free) part 5 of the plate 4 in such a manner that the edges 7a cross the exposed part 5. The edges 7a are welded to the exposed part 5 of the plate with welding electrodes set on the upper surface of the current collector under pressure.

Several problems can occur in the use of a connecting piece such as that described above. First, the connecting piece edges 7a are not always vertically extended from the flat portion 7b. Secondly, even if the edges 7a are vertically extended from the flat portion 7b, the edges 7a do not always vertically cross the exposed part of the plate. For these reasons, when the pair of welding electrodes are set on both end portions of the current collector, the edges 7a are pushed by the welding electrodes thus being inclined inwardly or outwardly through slipping off on the exposed part 5 of the plate. As a result, frequently the edges 7a are not completely engaged with the exposed part 5 of the plate, and accordingly the former are incompletely welded to the latter. That is, the disclosed connecting piece is still disadvantageous in that the edges are not positively welded to the exposed part of the plate at all the welding points.

In order to eliminate this difficulty, a variety of methods have been proposed in which the edge of the exposed part of the plate is set at the same level, the plates are modified in configuration, the material of the connecting piece is changed, and the welding conditions are improved. However, none of these methods are satisfactory in practice. On the other hand, the height of each edge extended vertically from the flat portion of the current collector is generally about two to five times the thickness of the current collector so that the connecting piece can be readily formed by bending the steel plate. The above-described difficulty may be eliminated by increasing the height of each edge so that the latter is deeply engaged with the exposed part of the plate. However, in this case, it is necessary to increase the width of the exposed (mass-free) part 5 of the plate, i.e., it is necessary to decrease the effective area of the plate, and accordingly the battery operating characteristics are degraded. If the edges of the current collector are deeply engaged with the exposed part of the plate, then they may contact with the other plate of opposite polarity so that the battery will be internally short-circuited and will no longer be serviceable. Thus, none of the conventional welding methods are satisfactory in practice.

SUMMARY OF THE INVENTION

An object of this invention is to provide an alkaline battery which exhibits high reliability and provides good performance. The present invention has been designed to overcome the above-described difficulties by using connecting pieces each having at least one current collector which is V-shaped in section. The connecting pieces are welded to the battery plates by welding electrodes having recessed bottom surfaces, which conform to the configuration of the current collectors.

BRIEF DESCRIPTION OF THE DRAWINGS

FIG. 6 is a perspective view showing a second example of the connecting piece according to the invention.

FIG. 7 is an explanatory diagram showing a method of welding the second example of the connecting piece to the exposed (mass-free) part of the plate.

FIG. 8 is a perspective view showing a third example of the connecting piece according to the invention.

FIG. 9 is an explanatory diagram showing the connecting piece of FIG. 8 which is welded to the exposed part of the plate.

FIG. 10 is an explanatory diagram showing the conventional piece of FIG. 1 which is welded to the exposed part of the plate.

DETAILED DESCRIPTION OF THE INVENTION

Figure 3:
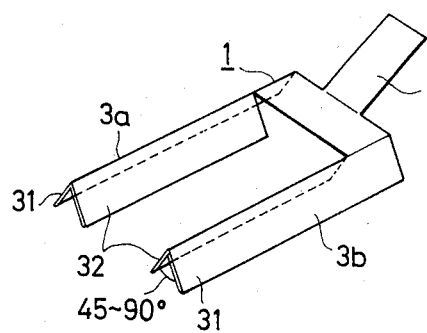
FIG. 3 is a perspective view showing a first example of a connecting piece used in an alkaline battery according to this invention.

FIG. 3 shows one example of a connecting piece used in an alkaline battery according to the invention. The connecting piece 1 comprises: a lead 2 connected to a terminal of the battery; and two current collectors 3a and 3b extended from one end of the lead 2. Each current collector is bent longitudinally by pressing to have two slanting surfaces 31 and 32, thus being V-shaped in section. The bending angle of the current collector can range from 45° to 90°, and the slanting surfaces are substantially equal in width to each other.

Figure 5:
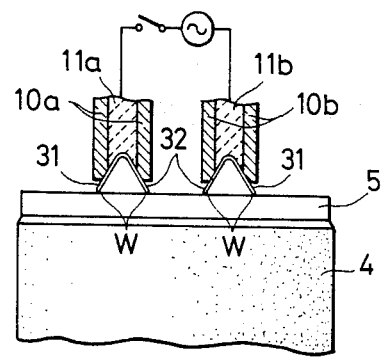
FIG. 5 is an explanatory diagram showing a method of welding the connecting piece to the exposed (mass-free) part of the plate.

The connecting piece thus formed is mounted on the exposed (mass-free) parts 5 of the plate 4 which are extended from one end face of the wound plates as shown in FIG. 5. On the other hand, welding electrodes are formed by cutting electrodes 11a and 11b, which are surrounded by insulating members 10a and 10b, so that the bottoms of the electrodes are similar in section to the current collectors. The welding electrodes thus formed are placed on the current collectors. Under this condition, the current collectors are pressed vertically. In this operation, stress is applied to the slanting surfaces 31 and 32 of each current collector so that the slanting surfaces open outwardly, but the movement of the slanting surfaces are blocked at the points W where the slanting surfaces are brought into contact with the upper edge of the exposed part 5 of the plate 4. As a result, the slanting surfaces are engaged with the exposed part at the points W. Accordingly, current from the welding electrodes flows collectively to the points, so that the current collectors are positively welded to the exposed parts of the plates. Thus, the manufactured battery is stable in performance, has good operating characteristics, and is high in reliability.

Figure 4:
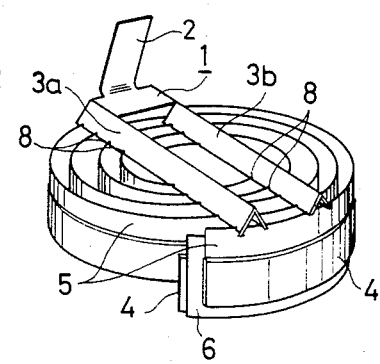
FIG. 4 is a perspective view showing the essential components of a plate assembly with the first example of the connecting piece in FIG. 3.

FIG. 4 shows the essential parts of the plates thus provided. In FIG. 4, reference character 4' designates a mating plate which is opposite in polarity to the plate 4. The plate 4' is wound after being displaced downwardly relative to the plate 4. Similarly as in the case of the plate 4, a connecting piece (not shown) is welded to the exposed part of the plate 4' at the other end face of the wound plates. Reference numeral 6 designates a separator interposed between the plates 4 and 4' which are opposite in polarity to each other; and reference numeral 8 designates welding points at which the current collectors of the connecting piece 1 are welded to the exposed part 5 of the plate 4.

FIGS. 6 and 7 show a second example of the connecting piece according to the present invention, which is more suitable to a small battery than the first example of the connecting piece, shown in FIG. 3. In the second example, a current collector 3 is bent along its center line, thus being V-shaped in section, and a lead 2 is extended from one end of the current collector 3. The current collector 3 has an elongated hole 9 cut along its ridge line. The provision of the elongated hole 9 is to reduce the sectional area of the connecting part between the slanting surfaces 31 and 32 of the current collector 3. As a result, when current is applied to the current collector with electrodes opposite in polarity to each other abutted against the slanting surfaces 31 and 32, the circulation of welding current through the current collector itself, is prevented, so that a larger part of the current flows to the contact points (welding points) at which the end portions of the current collectors are in contacts with the exposed part of the plate. When the connecting pieces are welded to the exposed parts of the plates which are protruded from the upper and lower end faces of the wound plates, the small welding electrodes may be used similarly as in the first example described above. However, employment of a welding electrode assembly as shown in FIG. 7 facilitates the welding operation.

The welding electrode assembly fabrication will now be described. First, an insulator 13 made of heat-resisting material such as ceramic is interposed between a pair of electrodes 12a and 12b. Then, the electrodes 12a and 12b with the insulator 13 are covered by an insulating case 14. The bottoms of the electrodes 12a and 12b are so recessed that they are similar in configuration to the rear surface of the current collector of the connecting piece. Furthermore, the lower end of the insulator 13 is protruded so as to fit in the elongated hole 9 cut in the current collector 3 of the connecting piece, thereby positively positioning the welding electrode assembly on the current collector 3. In the welding operation, the welding electrode assembly thus fabricated is placed on the current collector of the connecting piece under pressure, and a voltage is applied across the electrodes 12a and 12b.

In the above-described examples, the plate group is formed by spirally winding the belt-shaped positive plate, negative plates and separator. However, it should be noted that the invention is not limited thereto or thereby. That is, the technical concept of the invention is applicable to a plate group which is formed by laminating plurality of flat-plate-shaped positive plates; negative plates and separators. For instance, when single-plates are formed by punching a belt-shaped plate, the plate tabs can be formed by utilizing a part of the exposed (mass-free) portion of the plate during punching. If the single-plates are formed to have the plate tabs, then the current collector of the connecting piece according to the present invention can be mounted on the protruded ends of the plate tabs so that the current collector is welded to the plate tabs as described above. The configuration of the current collector of the connecting piece as viewed from above, is not limited to those of the above-described examples. That is, the current collector may be arranged by I-shaped, T-shaped, Y-shaped or cross-shaped depending on the purposes or use of the batteries.

A cylindrical alkaline battery has significant merit in that it can be quickly charged or discharged with large current. Next, another embodiment of the invention for providing such a battery will be described. For this purpose, it is essential to improve the characteristics of the active material, and furthermore the following two conditions are highly desirable in a good battery:

(1) The plates should be satisfactorily welded to the terminals, with stable performance and high reliability.

(2) The current flowing points of the plates should be substantially uniformly distributed so that all the surfaces of the wound plates operate uniformly.

By employing the structure of the current collector of the connecting piece and the connecting method thereof, which have been described above, the current collector can be firmly welded to the exposed part of the plate. Therefore, condition (1) can be satisfied. However, in order to satisfy condition (2), it is necessary to provide additional means. According to the specification of U.S. Pat. No. 3,960,603, the current flowing points are distributed uniformly over the plate, and the collector widely covering the exposed part of the plate has a number of holes around which edges or protrusions are formed. However, in practice, as was described before, the welding points are not uniformly distributed over the surface and the welds are insufficient in strength. Thus, the proposed method is still disadvantageous.

This difficulty has been eliminated by the present invention as will be detailed below. Each current collector of the connecting piece is made V-shaped in section, and three current collectors different in length are arranged in the form of the character "T" or "Y" so that the outer ends thereof are on the outer edges of the wound plates. The connecting piece 1, as shown in FIG. 8, comprises: a lead 2 which is connected to the positive or negative terminal of the battery; and three current collectors 3A, 3B and 3C which extend from one end of the lead 2, each being V-shaped in section. The current collectors 3A, 3B and 3C may have elongated holes 9a, 9b and 9c, respectively, along the ridges thereof. If triangular or round holes 15a, 15b and 15c are formed at the boundaries between the lead 2 and the current collectors 3A, 3B and 3C, then the current collectors can be readily bent by pressing so that they are each V-shaped in section (31a and 32a; 31b and 32b; and 31c and 32c).

When the connecting piece 1 thus formed is mounted on the exposed part of the spirally wound plate assembly, then the outer ends of the current collectors 3A, 3B and 3C, which differ in length, are positioned on the outer edge 16 of the spirally wound plate assembly, so that the exposed part of the plate is widely covered by the current collectors. Under this condition, a pair of welding electrodes, or a pair of welding electrodes whose bottoms are recessed so that they are brought into close contact with the surfaces 31a and 32a, 31b and 32b, and 31c and 32c of the current collectors 3A, 3B or 3C, respectively, are mounted on the surfaces of each current collector. While, under this condition, the welding electrodes are pressed downwardly, welding is carried out for each of the current collectors 3A, 3B and 3C, or between the current collectors 3A and 3B, 3A and 3C, and 3B and 3C. In this case, as was described above, the current collectors are positively welded to the exposed part of the plate, because the former engage strongly with the latter.

Figure 11:
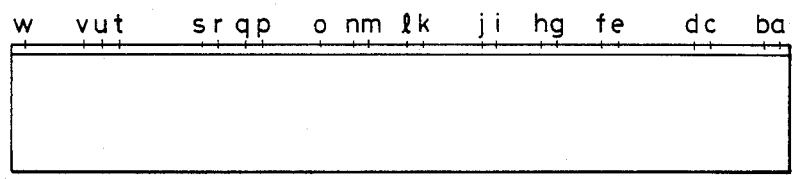
FIG. 11 is an unfolding diagram showing the distribution of welding points on the exposed part of the plate in FIG. 9.

In a connecting piece shown in FIG. 9, the current collectors 3A, 3B and 3C have lengths $l_1$, $l_2$ and $l_3$ which are equal substantially to the radius of the spirally wound plate assembly, to three-fourth of the radius, and to half ($\frac{1}{2}$) of the radius, respectively. These current collectors are welded to the exposed part of the positive plate or negative plate. In FIG. 9, reference characters a, b, c, d, e, f and so forth designate welding points at which the lower edges of the current collectors of the connecting pieces are welded to the exposed part of the plate with high reliability and in such a manner that the former are positively engaged with the latter, as described before. FIG. 11 is an unfolding diagram of the plate in FIG. 9. As is apparent from FIG. 11, the welding points a, b, c, d, ... are arranged from the outside of the wound plate in the stated order, thus being uniformly distributed over the plate. The welding points can be more uniformly distributed by adjusting the lengths $l_1$, $l_2$, and $l_3$ of the current collectors according to the size of the battery and the number of turns of the plate.

Figure 1:
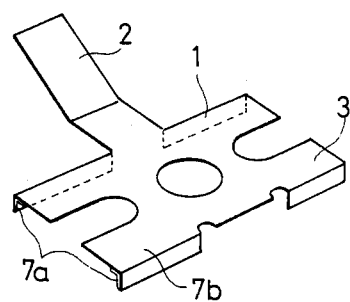
FIG. 1 is a perspective view showing a conventional connecting piece.
Figure 2:
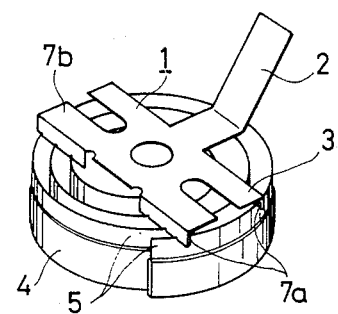
FIG. 2 is a perspective view showing the essential components of a plate assembly with the connecting piece in FIG. 1.
Figure 12:
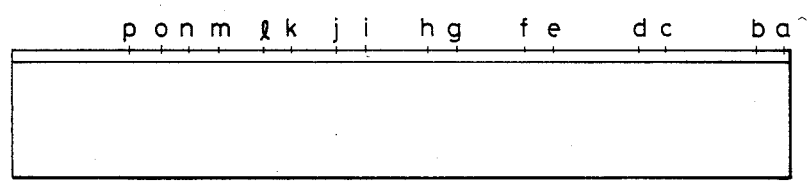
FIG. 12 is an unfolding diagram showing the distribution of welding points on the exposed part of the plate in FIG. 10.

FIG. 10 shows the conventional connecting piece (in FIG. 1) which is also welded to the exposed part of the plate. In FIG. 10, reference characters a, b, c, ... designate welding points where the edges of the current collector are welded to the exposed part of the plate. The wound plate removed from the battery and unfolded is shown in FIG. 12. The welding points a, b, c, ... are arranged from the outside of the wound plate in the stated order, but it cannot be said that the welding points are distributed substantially uniformly over the plate. Especially, in the inside of the wound plate, no welding point is provided over a relatively wide range because of the connecting piece structure.

Thus, according to the invention, even if the battery is charged or discharged with large current, the active material operates substantially uniformly over the entire surface of the plate. Therefore, an alkaline battery having excellent operating characteristics can be provided according to the invention. This is obtained by arranging the three current collectors different in length in the form of the letter "Y" or "T" as shown in FIG. 8.

Figure 13:
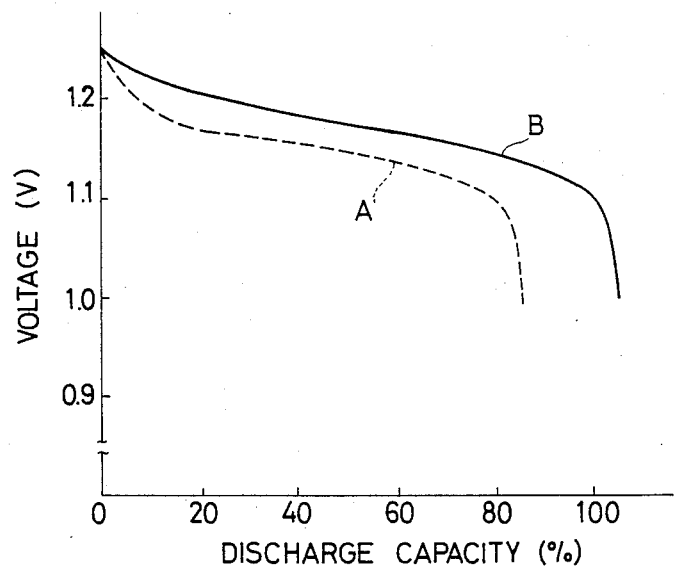
FIG. 13 is a graphical representation showing the discharge characteristic curves of an alkaline battery with the conventional connecting pieces and of an alkaline battery with the connecting pieces of the invention.

FIG. 13 shows the characteristic curves of a cylindrical alkaline battery (A) using the conventional connecting piece (FIG. 1) and a cylindrical alkaline battery (B) which is the same in size as battery (A) but uses the connecting piece (FIG. 8) of the invention. The curves are obtained when the batteries are charged with a current of 0.1 CA for fifteen hours and are then discharged with a current of 3 CA. As can be seen in FIG. 13, the battery (B) which uses the connecting piece according to the invention exhibits more excellent operating characteristics.

As is apparent from the above description, according to the invention, each of the current collectors of the connecting piece is V-shaped in section and is welded to the exposed part of the plate at the intersections, and therefore alkaline batteries provided according to the invention have substantially uniform characteristics and are high in reliability. In addition, according to the invention, an alkaline battery which can be quickly charged or discharged with large current and which exhibits excellent operating characteristics can be obtained by using the connecting pieces having the current collectors which are V-shaped in section, are different in length and are arranged in the form of the character "Y" or "T".

We claim:

1. A connecting piece for a battery having positive and negative terminals and having a plate assembly formed by winding or laminating positive and negative plates with a separator interposed therebetween so that the edges of said positive and negative plates partially protrude from opposite end faces of said plate assembly, said connecting piece comprising:

at least one current collector disposed across a plurality of said protruding edges, and forming an elongated V-shaped channel having an upper ridge and two lower edges joined by slanting surfaces which together define said V-shape, said two lower edges being welded to said protruding edges so that said lower edges are crosswise engaged with plural protruding edge portions, each said current collector having a free end and a base end, said base ends being joined by a bridging portion; and a lead formed at one end of said at least one current collector for connecting said at least one current collector to one of said positive or negative terminals.

2. A connecting piece for a battery, as claimed in claim 1, wherein said connecting piece comprises two current collectors having ridges which are substantially parallel to one another.

3. A connecting piece for a battery, as claimed in claim 1, wherein said connecting piece comprises two current collectors having ridges which are not parallel to one another.

4. A connecting piece for a battery, as claimed in claim 1, wherein said connecting piece comprises three current collectors having different lengths.

5. A connecting piece for a battery as claimed in claim 4, wherein said ridges of said three current collectors are arranged to form the character "T".

6. A connecting piece for a battery as claimed in claim 4, wherein said ridges of said three current collectors are arranged to form the character "Y".

7. A connecting piece for a battery as claimed in claim 1, wherein said at least one current collector includes an elongated hole extending along said ridge at the intersection of said two slanting surfaces.

8. A connecting piece for a battery as claimed in claim 7, said connecting piece having a substantially circular hole between said lead and each one of said elongated holes.

9. A connecting piece for a battery as claimed in claim 1, wherein said at least one current collector includes an elongated aperture along said upper ridge for receiving a portion of a welding probe.

* * * * *